United States Patent
Neilson et al.

(10) Patent No.: US 10,203,232 B2
(45) Date of Patent: Feb. 12, 2019

(54) FLOW METER WITH ROTOR ASSEMBLY

(71) Applicant: Cameron International Corporation, Houston, TX (US)

(72) Inventors: Thomas Neilson, Duncan, OK (US); Gordon Vincent, Duncan, OK (US); Omar M. Kabir, Waller, TX (US); Treyton Drake, Duncan, OK (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/277,901

(22) Filed: Sep. 27, 2016

(65) Prior Publication Data
US 2018/0087938 A1 Mar. 29, 2018

(51) Int. Cl.
*G01F 1/115* (2006.01)
*G01F 15/00* (2006.01)

(52) U.S. Cl.
CPC ............ *G01F 1/115* (2013.01); *G01F 15/006* (2013.01)

(58) Field of Classification Search
CPC . G01F 1/115; G01F 1/06; G01F 15/00; G01F 1/075; G01M 3/20
See application file for complete search history.

(56) References Cited

U.S. PATENT DOCUMENTS

| | | | |
|---|---|---|---|
| 4,155,249 A * | 5/1979 | Scott | G01M 3/20 239/129 |
| 4,282,883 A | 8/1981 | Yerushalmy | |
| 5,014,552 A | 5/1991 | Kamiunten et al. | |
| 5,182,952 A | 2/1993 | Pyzik | |
| 5,866,824 A * | 2/1999 | Schieber | G01F 1/05 73/861.79 |
| 6,220,832 B1 | 4/2001 | Schob | |
| 6,250,167 B1 | 6/2001 | Peace | |
| 6,898,987 B1 | 5/2005 | Hayman | |
| 8,613,608 B2 * | 12/2013 | Ree | F04C 2/1071 418/161 |
| 9,086,305 B2 * | 7/2015 | Nelson | G01F 1/075 |
| 9,095,428 B2 | 8/2015 | Kabir | |
| 9,778,081 B2 * | 10/2017 | Neilson | F01D 5/02 |
| 2010/0300213 A1 | 12/2010 | Fink et al. | |
| 2011/0162446 A1 | 7/2011 | Delatorre | |
| 2013/0189079 A1 | 7/2013 | Cooper | |
| 2014/0070654 A1 * | 3/2014 | Hamer | H02K 1/2766 310/156.21 |

(Continued)

FOREIGN PATENT DOCUMENTS

WO 99-56092 A1 11/1999

OTHER PUBLICATIONS

Woodworth, Inc., "Nanowear Resist Erosion and Abrasion in Pipelines Oil and Gas Industry", Nov. 11, 2015, found at https://web.archive.org/web/20150315140838/http://www.woodworthheattreating.com/nanowear.html, (2 pages).

(Continued)

*Primary Examiner* — Jewel V Dowtin
(74) *Attorney, Agent, or Firm* — Chamberlain Hrdlicka

(57) ABSTRACT

A flow meter for determining a flow rate of a fluid. The flow meter includes a housing comprising a flow bore, a rotor assembly rotatable by the flow of fluid within the flow bore and comprising a thermally diffused metallic material, and a sensor unit configured to generate a signal indicative of a rotational rate of the rotor assembly.

22 Claims, 3 Drawing Sheets

(56) References Cited

U.S. PATENT DOCUMENTS

2014/0326075 A1  11/2014 Nelson

OTHER PUBLICATIONS

ITT Barton Instruments, "Installation and Operation Manual Models 7511 & 7518 Rim Drive Meters", 1984, ITT Corporation, (12 pages).
International Search Report & Written Opinion issued in corresponding application No. PCT/US2016/060866, dated Feb. 27, 2017, 15 pgs.
International Search Report and Written Opinion of PCT Application No. PCT/US2017/053043 dated Jan. 5, 2018: pp. 13.

* cited by examiner

FLOW METER WITH ROTOR ASSEMBLY

BACKGROUND

This section is intended to provide background information to facilitate a better understanding of the various aspects of the described embodiments. Accordingly, it should be understood that these statements are to be read in this light and not as admissions of prior art.

Flow meters measure the volumetric flow rate of a fluid within a pipeline. Some flow meters employ a rotor supported for rotation in the fluid's flow path. Typical rotors have paddlewheel, turbine, or Pelton-wheel designs. Flowing fluid through the flow path interacts with the rotor and causes the rotor to rotate. Measuring the rotor's resulting rotation indicates the fluid's flow rate, which can be processed to determine the volumetric flow rate of the fluid within the pipeline.

BRIEF DESCRIPTION OF THE DRAWINGS

For a detailed description of the embodiments of the invention, reference will now be made to the accompanying drawings in which.

DETAILED DESCRIPTION

This disclosure provides a method and apparatus for measuring a flow rate of a fluid. Specifically, this disclosure provides a rotor assembly for rotating in a flow bore in a flow meter housing, wherein the rotor assembly includes a thermally diffused metallic material.

Fluids transported via pipeline can be laden with debris (e.g., shale oil or gas having sand, rocks, or other debris). To prevent erosion, flow meters with turbine rotors can use a tungsten carbide shaft machine pressed through the bore of a steel alloy turbine rotor. However, the tungsten carbide shaft is brittle and prone to breaking. In addition, the machine pressed rotor can weaken, slipping free of the shaft. To obtain the ductility of steel and a hardness substantially similar to tungsten carbide, a flow meter can include a steel alloy shaft hardened using a thermal chemical diffusion process. Further, the rotor can be made integral to the shaft through additive manufacturing, eliminating a rotor that can slip free of the shaft.

Figure 1:
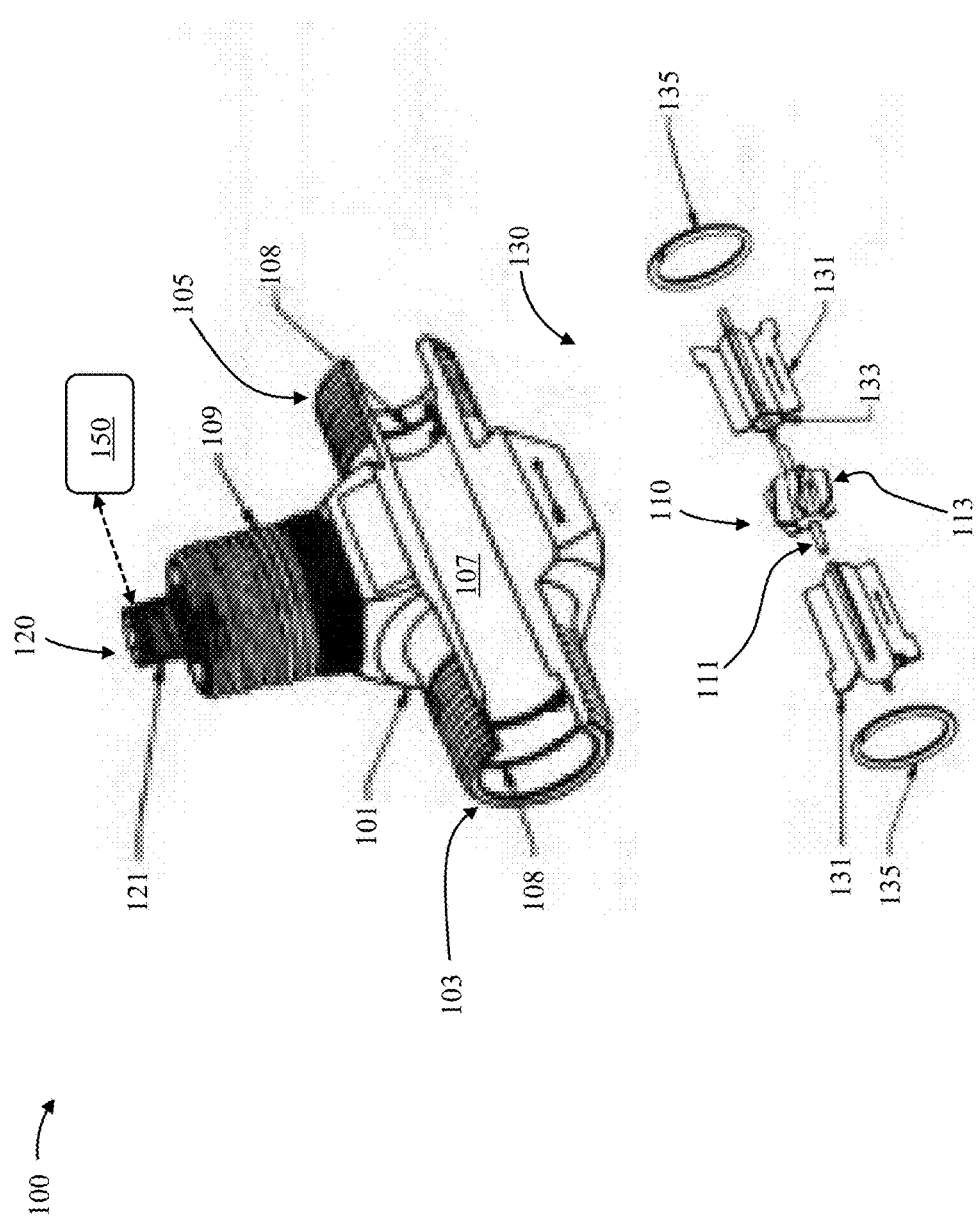
FIG. 1 depicts a flow meter, according to one or more embodiments.
Figure 2:
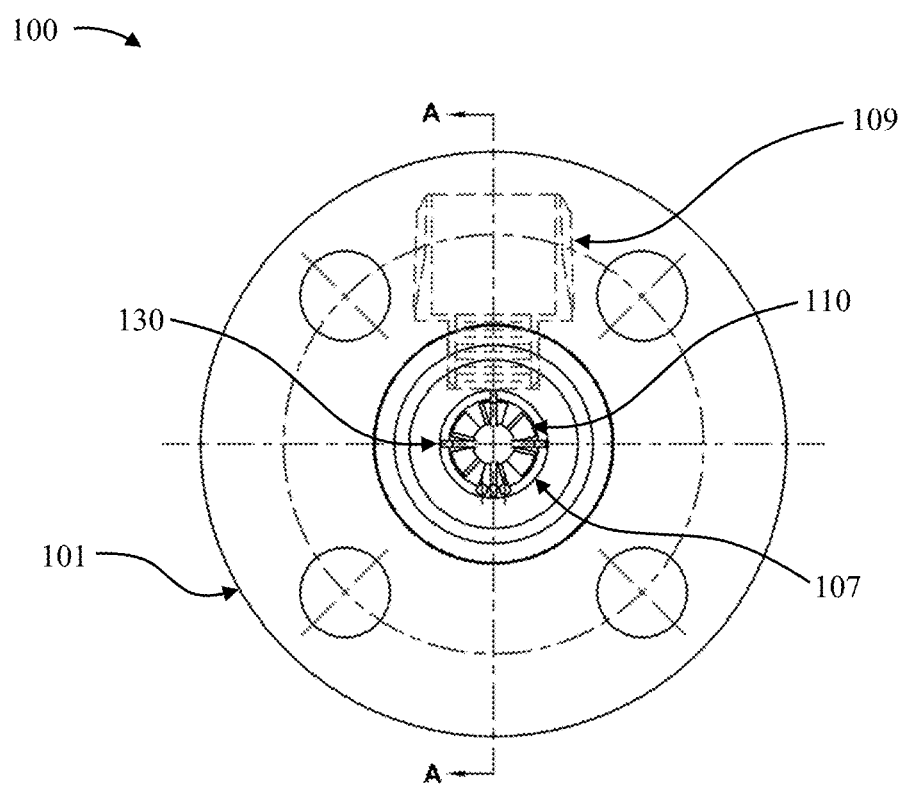
FIG. 2 depicts a cross-section of the flow meter of FIG. 1, according to one or more embodiments.
Figure 3:
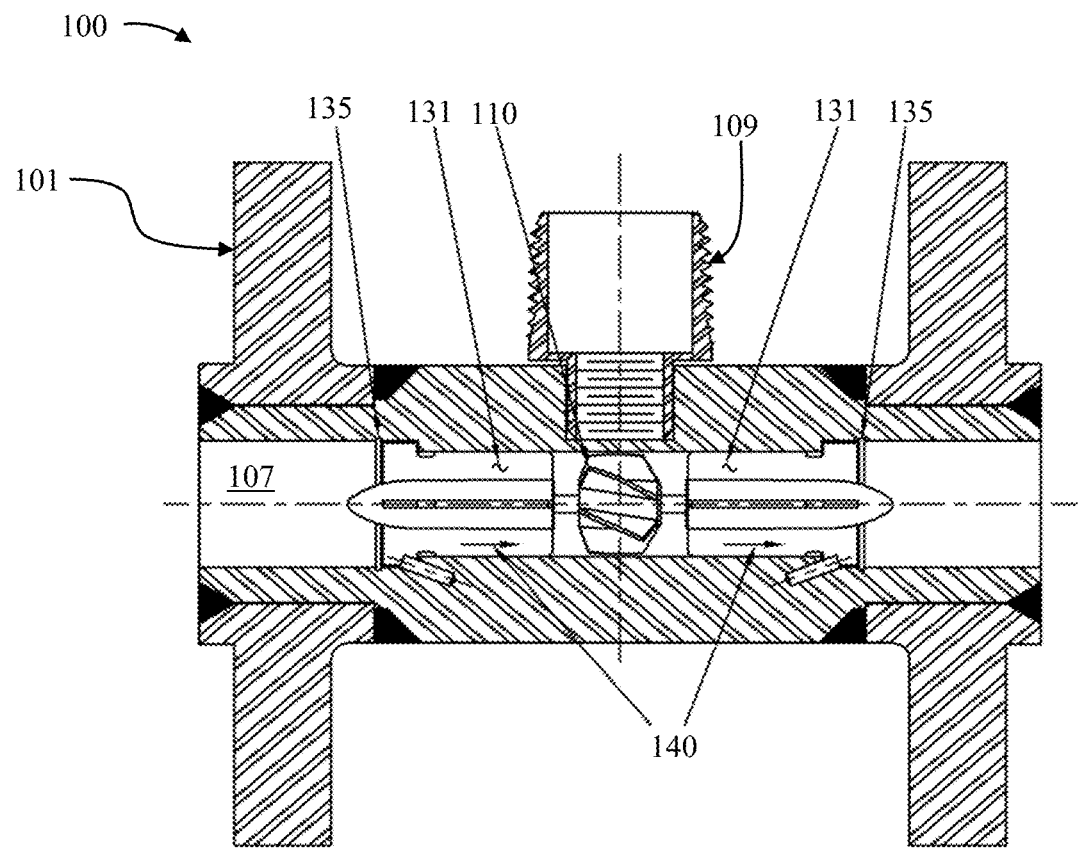
FIG. 3 depicts a cross-section of the flow meter of FIG. 1 along the line A-A, according to one or more embodiments.

FIG. 1 shows an exploded view of flow meter 100, in accordance with one or more embodiments. FIG. 2 depicts a cross-section of the flow meter 100 of FIG. 1 looking down a flow bore 107, in accordance with one or more embodiments. FIG. 3 depicts a cross-section of the flow meter of FIG. 1 along the line A-A from FIG. 2, according to one or more embodiments. Arrows 140 indicate the flow direction of fluid through the flow bore 107.

As shown, the flow meter 100 includes a housing 101 that holds a rotor assembly 110 and a sensor unit 120 for measuring a condition of the rotor assembly 110, such as the rotational rate of the rotor assembly 110. The housing 101 includes an inlet end 103, an outlet end 105, and a flow bore 107 extending through the housing 101 between the inlet end 103 and the outlet end 105. The rotor assembly 110 is located at least partially in the flow bore 107 such that flow of a fluid through the flow bore 107 causes the rotor assembly 110 to rotate.

A support assembly 130 is coupled to the housing 101 and supports the rotor assembly 110 for rotation in the flow bore 107. The rotor assembly 110 includes a rotor shaft 111 with a rotor 113 either coupled to or integral with the shaft 111. In particular, the shaft 111 is rotatably coupled to the support assembly 130, which includes support vanes 131, each having a bore 133 therethrough to receive the shaft 111. In addition, the bore 133 may include bearings to reduce the friction between the rotating shaft 111 and the support assembly 130. The housing 101 can include one or more grooves 108 to receive retainer rings 135 that fasten the support assembly 130 to the flow bore 107. Although the support assembly 130 is described as shown, it should be appreciated that the support assembly 130 can include any suitable device coupled to the housing 101 to the receive shaft 111 and position the rotor assembly 110 at least partially in the flow bore 107 such that flow of the fluid causes the rotor assembly 110 to rotate.

Figure 4:
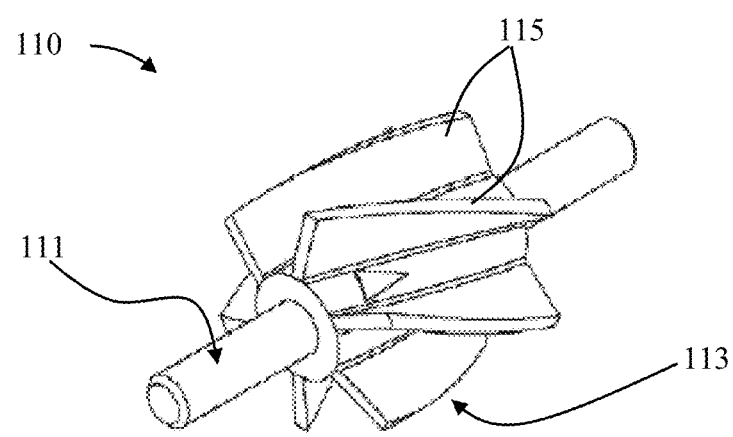
FIG. 4 depicts the rotor assembly of FIG. 1, according to one or more embodiments.

FIG. 4 depicts the rotor assembly 110 of FIG. 1, according to one or more embodiments. The rotor 113 includes one or more rotor blades 115, which are illustrated as turbine blades on a turbine rotor. The rotor blades 115 can include any suitable arrangement of blades, such as turbine blades, paddles on a paddlewheel, the blades on a Pelton wheel, etc. In one or more embodiments, the rotor shaft 111 and the rotor 113 can form a single unified body constructed from the same block of material such that the rotor 113 is an extension of the shaft 111. That is, the rotor assembly 110 can include a rotor shaft 111 and rotor blades 115 integral with the rotor shaft 111. In other embodiments, the rotor 113 can be fixedly coupled to the shaft 111, such as machine pressing the rotor 113 to the shaft 111.

The rotor assembly 110 includes a thermally diffused metallic material comprising a metallic material and a diffusion substance. The surface of the metallic material is hardened by changing a molecular structure of the surface through thermal chemical diffusion using at least one diffusion substance. As an example, the diffusion substance can include at least one gas or chemical (e.g., nitrogen, aluminum, magnesium, or silicon) that hardens or enhances the erosion resistance of the metallic material. The diffusion substance can include a non-metallic material, such as a ceramic (e.g., aluminum oxide or silicon oxide). The thermally diffused metallic material can retain the ductility of the base metallic material (e.g., steel alloy) without becoming brittle. Retaining its ductility, the hardened metallic material can resist cracking. As an example, the thermally diffused metallic material may include a steel alloy that retains the ductility of steel, but is hardened to enhance its resistance to erosion.

The thermally diffused metallic material may be hardened when a hardness of the diffusion zone of the metallic material increases according to a hardness scale (e.g., Rockwell hardness of 10, 20, 30, 40, or a higher hardness on the Rockwell C scale) relative to the hardness of the base metallic material (e.g., steel alloy) before undergoing the thermal chemical diffusion process. The resulting hardness of the thermally diffused metallic material can depend on the diffusion temperature or the amount of time the metallic material is exposed to the thermal chemical diffusion process. The diffusion zone can be a pre-determined molecular layer of the metallic material that extends from the surface of the metallic material to a pre-determined molecular depth. The thermally diffused metallic material can include a steel alloy (e.g., SAE 4140 steel) or any other suitable ferrous material.

The thermal chemical diffusion process can also enhance the corrosive resistance of the metallic material. The diffusion substance can also include at least one gas or chemical (e.g., nitrogen, aluminum, magnesium, or silicon) that enhances the corrosive resistance of the metallic material. The thermally diffused metallic material can resist corrosion caused by salt water or seawater. Enhancing the corrosive resistance of the metallic material can allow it to resist corrosion from salt water for at least 60 days or longer of continuous exposure to salt water. Enhancing the corrosive resistance of the metallic material can include resisting a galvanic corrosion reaction in presence of seawater or other dielectric metallic materials for at least 60 days or longer. Thus, the rotor assembly 110 can include a thermally diffused metallic material configured to provide resistance to at least one of erosion, corrosion, and cracking. Further, the shaft 111, the rotor 113, or both can include a thermally diffused metallic material.

Any suitable components included in the flow meter 100 may be molecularly altered using a thermal chemical diffusion process suitable to enhance their resistance to erosion, corrosion, or cracking. As examples, the housing 101, support assembly 130, or bearings in the flow meter 100 can be molecularly altered using a thermal chemical diffusion process suitable to enhance their resistance to erosion, corrosion, or cracking. The thermally diffused metallic material can be molecularly altered using a thermal chemical diffusion process referred to as NANOWEAR® available from Woodworth, Inc., of Flint, Mich.

The rotor assembly 110 may be formed using additive manufacturing. One example of an additive manufacturing process melts ultra-thin layers of a metallic material according to the desired shape of the rotor assembly 110 using a high-precision laser. An ultra-thin layer can include a layer that is less than or about 20 micrometers thick. This layer is formed using powder-based metallurgical techniques from known metallic materials which are suitable for multiple purposes, such as (a) corrosion resistance against most acidic and alkalinic chemical fluids, and (b) thermal chemical diffusion. A metallic material with suitable multiple purposes includes a steel alloy. Additive manufacturing can provide a reduction in cycle time (i.e., production lead time) due to its potential to manufacture multiple components simultaneously. Any of the components included in the flow meter 100 may be formed using additive manufacturing, subtractive manufacturing, or any other suitable manufacturing process to construct the components.

Referring to FIGS. 1-4, as the fluid (e.g., a hydrocarbon fluid) flows through the flow bore 107, the fluid rotates the rotor 113 coupled to the support assembly 130. The sensor unit 120, for measuring the rotational rate of the rotor 113, is located within the housing 101 through a conduit 109. Optionally, the conduit 109 may be isolated from the flow bore 107 to prevent fluid from accessing the sensor unit 120. In the example shown, the sensor unit 120 includes a magnetic sensor 121 configured to detect the rotational rate of the rotor 113, which may include a magnetically detectable material such as a steel alloy. The sensor unit 120 generates a signal indicative of the rotational rate of the rotor 113, which, combined with the known dimensions of the rotor 113, blades 115, and flow bore 107, can be used to determine the flow rate of the fluid through the flow bore 107. A processor 150 may be in communication with the sensor unit 120 and configured to determine the flow rate of the fluid passing through the flow bore 107 using the signal generated by the sensor unit 120.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A flow meter for determining a flow rate of a fluid, comprising:
   a housing comprising a flow bore;
   a rotor assembly rotatable by the flow of fluid within the flow bore and comprising a thermally diffused metallic material, wherein the thermally diffused metallic material comprises a metallic material and a diffusion substance; and
   a sensor unit configured to generate a signal indicative of a rotational rate of the rotor assembly.

2. The flow meter of claim 1, wherein the rotor assembly comprises a rotor shaft comprising the thermally diffused metallic material.

3. The flow meter of claim 2, wherein the rotor assembly comprises a rotor shaft and a rotor comprising rotor blades, the rotor being at least partially located in the flow bore.

4. The flow meter of claim 3, wherein the rotor blades comprise turbine blades.

5. The flow meter of claim 3, wherein the rotor is fixedly coupled to the rotor shaft by machine pressing.

6. The flow meter of claim 1, wherein the rotor assembly comprises a rotor shaft and rotor blades integral with the rotor shaft, the rotor blades being at least partially located in the flow bore.

7. The flow meter of claim 6, wherein the integral rotor blades comprise turbine blades.

8. The flow meter of claim 6, wherein the rotor shaft and the integral rotor blades are formed by additive manufacturing.

9. The flow meter of claim 1, wherein the thermally diffused metallic material comprises a hardened surface, hardened by changing a molecular structure of the surface through thermal chemical diffusion of the diffusion substance.

10. The flow meter of claim 1, wherein the thermally diffused metallic material comprises a steel alloy.

11. The flow meter of claim 1, wherein the thermally diffused metallic material is configured to resist erosion, corrosion, and cracking.

12. The flow meter of claim 1, wherein the fluid comprises a hydrocarbon fluid.

13. A rotor assembly for rotating in a flow bore in a flow meter housing, the assembly comprising a rotor shaft comprising a thermally diffused metallic material and rotatable by the flow of fluid in the flow meter housing, wherein the thermally diffused metallic material comprises a metallic material and a diffusion substance.

14. The rotor assembly of claim 13, further comprising a rotor comprising rotor blades.

15. The rotor assembly of claim 14, wherein the rotor blades are integral with the rotor shaft.

16. The rotor assembly of claim 15, wherein the rotor shaft and the integral rotor blades are formed by additive manufacturing.

17. A method for determining a flow rate of a fluid, comprising:
    flowing a fluid through a flow bore of a housing;
    rotating a rotor assembly with the fluid flowing through the flow bore, wherein the rotor assembly comprises a thermally diffused metallic material, wherein the thermally diffused metallic material comprises a metallic material and a diffusion substance;
    detecting a rotational rate of the rotating rotor;
    generating a signal indicative of the rotational rate of the rotor; and
    determining the flow rate of the fluid using the signal.

18. The method of claim 17, wherein the rotating comprises rotating a shaft comprising the thermally diffused metallic material.

19. The method of claim 17, wherein the rotating comprises rotating a shaft and rotor blades integral with the rotor shaft, the rotor blades being at least partially in the flow bore.

20. The flow meter of claim 1, wherein the thermally diffused metallic material has a hardness of about 10 to about 40, on the Rockwell C scale, greater than the hardness of the metallic material.

21. The rotor assembly of claim 13, wherein the thermally diffused metallic material has a hardness of about 10 to about 40, on the Rockwell C scale, greater than the hardness of the metallic material.

22. The method of claim 17, wherein the thermally diffused metallic material has a hardness of about 10 to about 40, on the Rockwell C scale, greater than the hardness of the metallic material.

* * * * *